United States Patent [19]

Kiefer et al.

[11] 4,357,515
[45] Nov. 2, 1982

[54] MANUAL TUBE-TO-TUBESHEET WELDING TORCH

[75] Inventors: Joseph H. Kiefer; Danny J. Smith, both of Tampa, Fla.

[73] Assignee: The United States of America as represented by the United States Department of Energy, Washington, D.C.

[21] Appl. No.: 142,190

[22] Filed: Apr. 21, 1980

[51] Int. Cl.³ .............................................. B23K 9/02
[52] U.S. Cl. ............................. 219/60.2; 219/60 A; 219/75; 219/125.11; 228/29
[58] Field of Search .................. 219/60 R, 60 A, 60.2, 219/74, 75, 125.11; 228/105, 29

[56] References Cited

U.S. PATENT DOCUMENTS

| 3,275,795 | 8/1966 | Bosna et al. | 219/60.2 X |
| 3,534,199 | 10/1970 | Downey et al. | 219/60 A |
| 3,754,114 | 8/1973 | Peyrot | 219/60.2 |
| 3,776,449 | 12/1973 | Jungle | 219/60.2 X |
| 3,841,547 | 10/1974 | Bartley | 219/60.2 X |
| 4,243,868 | 1/1981 | Graham | 219/60.2 X |

FOREIGN PATENT DOCUMENTS 51-35179 9/1976 Japan .............................. 219/125.11

OTHER PUBLICATIONS

*IBM Technical Disclosure Bulletin,* vol. 23, No. 6, Nov. 1980, "Non Impact Printer Using Optical Fibers", pp. 2362-2363 by Kightlinger et al.

*Primary Examiner*—David Smith, Jr.
*Assistant Examiner*—Keith E. George
*Attorney, Agent, or Firm*—F. J. Baehr, Jr.

[57] ABSTRACT

A welding torch made of a high temperature plastic which fits over a tube intermediate the ends thereof for welding the juncture between the tube and the back side of a tube plate and has a ballooned end in which an electrode, filler wire guide, fiber optic bundle, and blanketing gas duct are disposed.

2 Claims, 4 Drawing Figures

MANUAL TUBE-TO-TUBESHEET WELDING TORCH

GOVERNMENT CONTRACT

The United States Government has rights in this patent as set forth in Contract EN-77-C-02-4177 between the Department of Energy and Westinghouse Electric Corporation.

BACKGROUND OF THE INVENTION

This invention relates to a welding torch and more particularly to a torch, which fits over a tube to weld the tube to the back side of a tubesheet.

The manufacturer of liquid metal heat exchangers for the production of electricity from nuclear energy presently contemplates the utilization of double wall tubes in the heat exchanger to transfer heat from a liquid metal to water or steam. To provide leak detection in either wall of the heat exchanger tube, the tubes will be welded to both the front and back side of the tubesheet. Apparatus for welding the tubes to the front side of the tubesheet is in current use, however, welding on the back side of the tubesheet is more difficult because of the interference of the tubes and the limited space between the tubes. Local manual repair of weld defects in this area is the most difficult operation for which no welding torch is presently available.

SUMMARY OF THE INVENTION

In general, a welding torch which fits over a tube to form a weld at the juncture of the tube and a plate, when made in accordance with this invention, comprises a housing having a central bore which receives a tube and is made up of at least two separable parts which are separated to allow the housing to be placed over the tube at a portion thereof intermediate of its ends. The torch also comprises an electrode disposed in the housing, a filler metal duct, a fiber optic bundle disposed adjacent the electrode and filler metal duct to allow continuous visual observation of the weld and the addition of filler metal thereto and a shielding gas duct for supplying shielding gas to the weld.

BRIEF DESCRIPTION OF THE DRAWINGS

The objects and advantages of this invention will become more apparent from reading the following detailed description in conjunction with the accompanying drawings in which.

DESCRIPTION OF THE PREFERRED EMODIMENT

Figure 1:
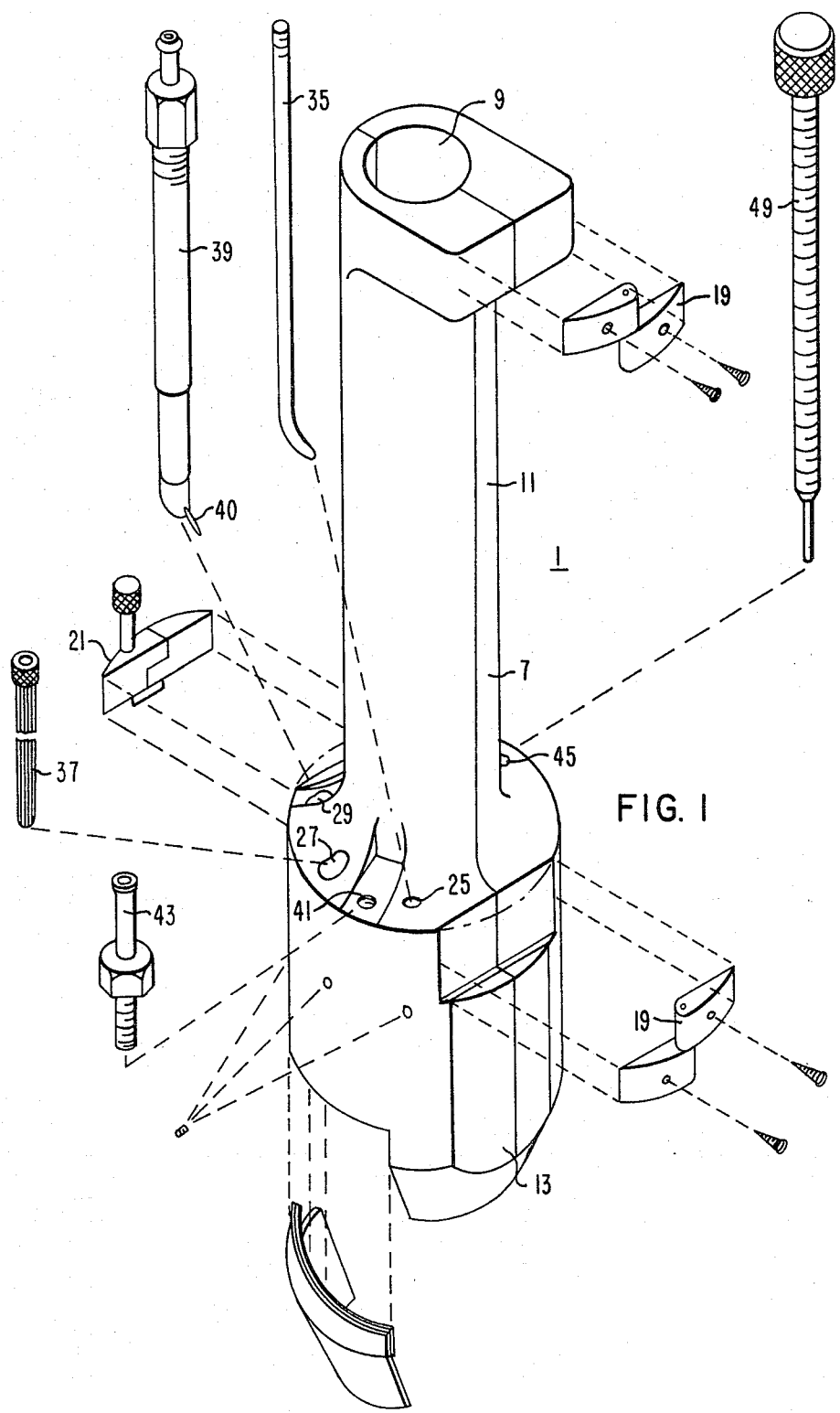
FIG. 1 is an exploded isometric view of a welding torch made in accordance with this invention.
Figure 2:
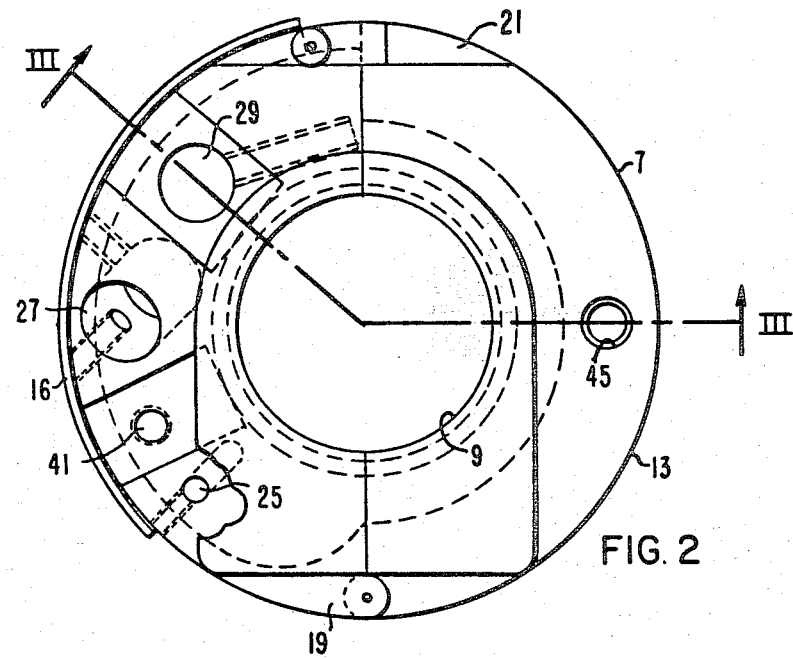
FIG. 2 is a top view of the welding torch.
Figure 3:
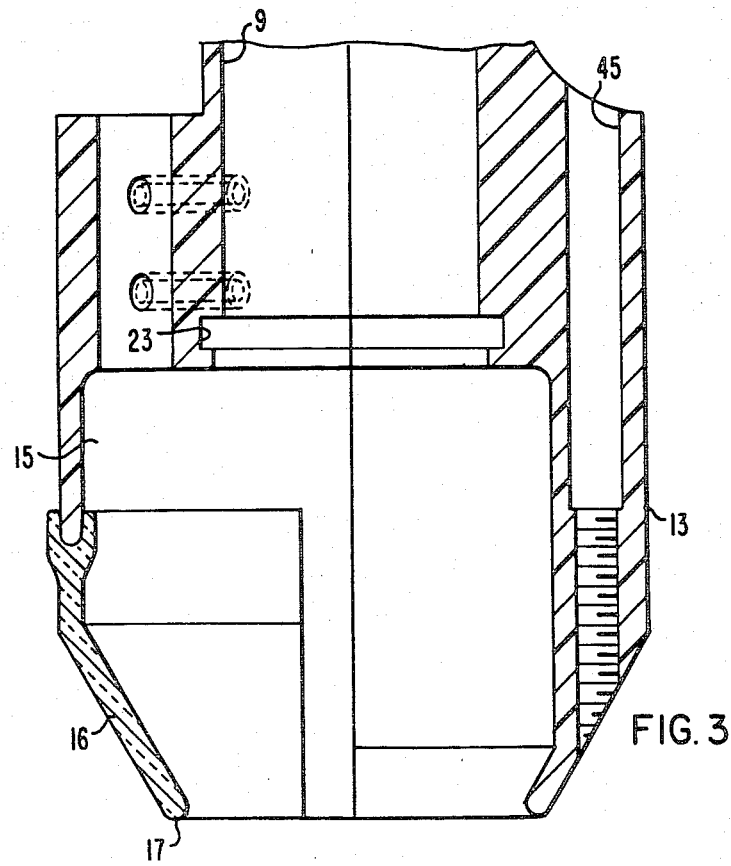
FIG. 3 is a sectional view taken on line III—III of FIG. 2.

Referring now to the drawings in detail there is shown a welding torch 1 which fits over a tube 3 intermediate the ends thereof for welding the juncture of the tube 3 and a tubesheet or plate 5.

As shown best in FIG. 1 the torch 1 comprises a housing 7 made of a high temperature plastic such as Vespel having a central bore 9 which receives the tube 3. The housing 7 is made up of two separable parts or halves, which are separated to allow the housing to be placed over the tube 3 at a portion thereof intermediate its ends. The housing 7 has a shank portion 11 and an enlarged or ballooned portion 13 on one end of the shank portion 11.

The ballooned portion 13 has an enlarged opening 15 which is larger than the central bore 9 and is eccentric thereto providing a thin wall in at least one portion of the ballooned portion 13 of the housing 7. At least a portion of this thin wall is made of a ceramic material and forms a removable insert 16 which is clamped to the thin wall portion. The ballooned portion 13 as well as the opening 15 therein tapers inwardly toward the central bore adjacent the distal end 17 of the ballooned portion 13. Hinges 19 and a latch 21 are disposed on the housing 7 and cooperate to allow halves of the housing 7 to separate or open as a clam shell and fit over a tube.

A centrifugal groove 23 is disposed in the central bore 9 adjacent the enlarged opening 15 in the ballooned portion 13. The ballooned portion 13 has a plurality of openings 25, 27 and 29 which extend from adjacent shank portion and open into the enlarged opening 15. These openings are generally parallel to the longitudinal axis of the torch or may form an acute angle of up to approximately 10° therewith and are preferably grouped close together.

The opening 25 is adapted to receive a filler metal guide tube 35 which has its end bent to feed filler metal wire to the weld area. The opening 27 is adapted to receive a fiber optic bundle 37. The bundle may have a monocular eyepiece or it may be bifurcated and have a binocular eyepiece. An electrode holder 39 is disposed in the opening 29 and extends into the enlarged opening 15. The electrode holder 39 has a tungsten tip or electrode 40 disposed at an angle of approximately 40° with respect to the longitudinal axis of the electrode holder.

An opening 41 extends from adjacent the shank portion 11 to the circumferential groove 23 in the bore 9 and has a blanketing or shielding gas supply tube 43 which supplies shielding gas to the circumferential groove 23 and enlarged opening 15, which shields the entire weld area.

An opening 45 extends from adjacent the shank portion 11 through the ballooned portion 13 and has threads 47 disposed therein. A threaded height adjustment screw 49 is disposed to engage the threads 47 and is adapted to adjust the height of the torch 1 relative to the tube plate 5.

Figure 4:
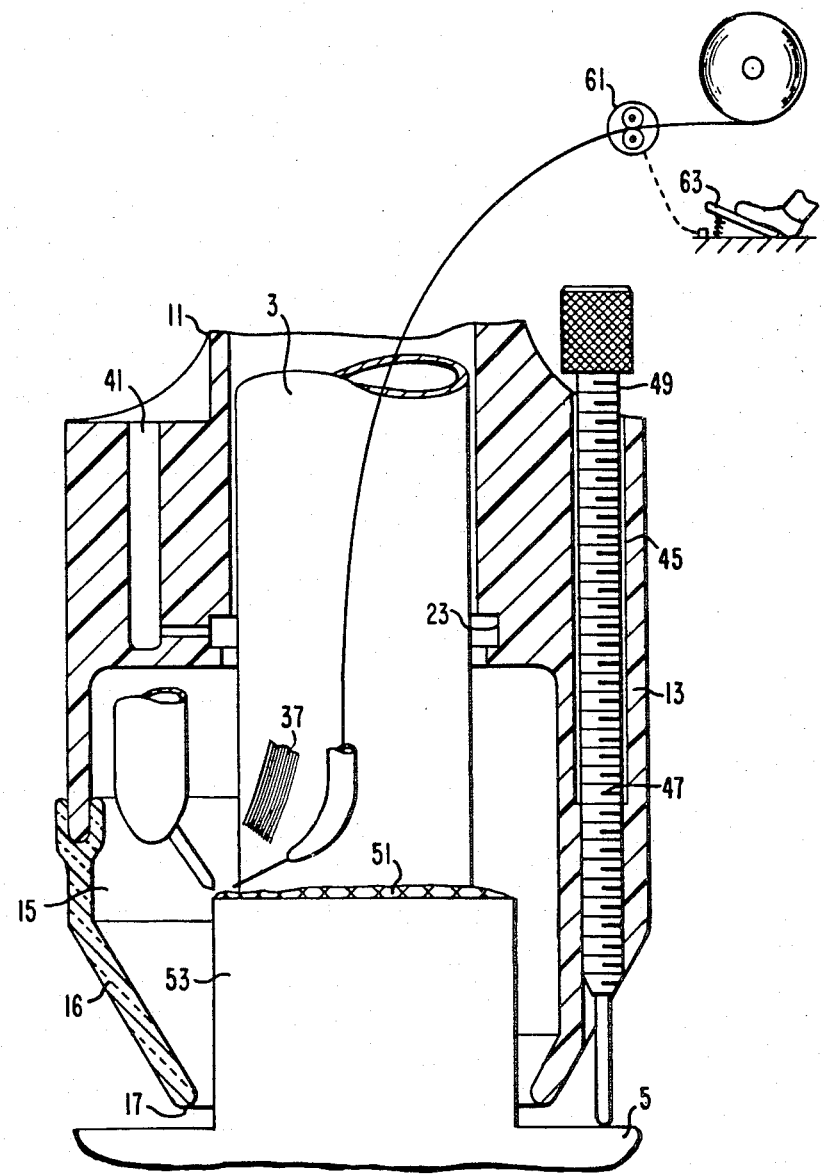
FIG. 4 is an enlarged partial sectional view of the welding zone.

FIG. 4 shows a portion of the torch 1 disposed over a tube 3 and producing a weld 51 adjacent the juncture of the tube 3 and a boss 53 on the tube plate 5. The torch is held at the correct elevation by the adjusting screw 49, which fixes the distance between the welding tip 40 and the weld puddle. Alternately, the tapered distal end 17 can be applied directly to the tubesheet 5 and the distance between the welding tip 40 and the weld puddle 51 can be controlled by changing the elevation of the electrode holder 39. Filler wire is fed through the filler wire guide tube 35. Preferably the rate at which the filler wire is fed to the weld puddle is controlled by a motor driven wire feed system 61 operated by a foot peddle 63 which frees both of the welder's hands to rotate the torch about the tube. The fiber optics bundle 37 provides continuous visual observation of the weld puddle and filler metal either through a tinted eyepiece or the image may be projected on a frosted screen to reduce the light intensity produced by the arc, or projected onto a closed circuit television through a video imaging tube.

What is claimed is:

1. A welding torch which fits over a tube to form a weld at the juncture of the tube and a plate, said torch comprising a housing having a central bore which receives a tube, which is made of at least two separate portions hinged together allowing the housing to be placed over the tube intermediate its ends, and which has a ballooned portion on one end thereof;

the clearance between the tube and the housing being greatly enlarged in the ballooned portion thereof;

an electrode disposed in said housing and extending into the ballooned portion thereof;

a filler metal duct disposed in said housing and extending into the ballooned portion thereof;

a fiber optic bundle disposed in said housing and extending into said ballooned portion adjacent the electrode and filler metal duct to allow continuous visual observation of the weld and the addition of filler metals thereto;

a circumferential groove disposed in the central bore adjacent the ballooned portion;

a shielding gas duct disposed in said housing in fluid communication with the circumferential groove to provide shielding gas to the weld; and means for setting the distance between the electrode and the plate to maintain the proper arc voltage as the housing and electrode are rotated around the tube to provide a weld at the juncture thereof.

2. A welding torch as set forth in claim 1, wherein the housing is a high temperature plastic material and the ballooned portion has a wall portion disposed adjacent the electrode made of a ceramic material.

* * * * *